US012726239B2

(12) United States Patent
Kurras et al.

(10) Patent No.: US 12,726,239 B2
(45) **Date of Patent: *Sep. 1, 2026**

(54) COMMUNICATION DEVICES, COMMUNICATION COORDINATING DEVICES, AND COMMUNICATION METHODS

(71) Applicant: Fraunhofer-Gesellschaft zur Förderung der angewandten Forschung e.V., Munich (DE)

(72) Inventors: Martin Kurras, Berlin (DE); Lars Thiele, Berlin (DE); Junyoung Nam, Berlin (DE); Marcus Großmann, Erlangen (DE); Niels Hadaschik, Erlangen (DE); Thomas Haustein, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,411

(22) Filed: Sep. 27, 2023

(65) Prior Publication Data

US 2024/0056135 A1 Feb. 15, 2024

Related U.S. Application Data

(63) Continuation of application No. 17/065,640, filed on Oct. 8, 2020, now Pat. No. 11,817,920, which is a (Continued)

(30) Foreign Application Priority Data

Apr. 10, 2018 (EP) .................................... 18166602

(51) Int. Cl.
*H04B 7/0413* (2017.01)
*H04B 7/06* (2006.01)
(Continued)

(52) U.S. Cl.
CPC ....... *H04B 7/0413* (2013.01); *H04B 7/06952* (2023.05); *H04B 7/088* (2013.01); *H04W 72/046* (2013.01); *H04W 72/541* (2023.01)

(58) Field of Classification Search
CPC .... H04B 7/0413; H04B 7/0695; H04B 7/088; H04W 72/541; H04W 72/046
(Continued)

(56) References Cited

U.S. PATENT DOCUMENTS

| | | | |
|---|---|---|---|
| 9,654,272 | B2 | 5/2017 | Nam et al. |
| 2009/0201839 | A1 | 8/2009 | Smee et al. |

(Continued)

FOREIGN PATENT DOCUMENTS

| | | | |
|---|---|---|---|
| CN | 102742173 | A | 10/2012 |
| CN | 104303477 | A | 1/2015 |

(Continued)

OTHER PUBLICATIONS

3GPP TR 36.897 V13.0.0, "3rd Generation Partnership Project; Technical Specification Group Radio Access Network; Study on elevation beamforming / Full-Dimension (FD) Multiple Input Multiple Output (MIMO) for L TE (Release 13)," Jun. 2015.

(Continued)

*Primary Examiner* — Leila Malek
(74) *Attorney, Agent, or Firm* — McClure, Qualey & Rodack, LLP

(57) ABSTRACT

The application relates to a communication device [e.g., UE] for communicating with one or more other communication devices using multiple-input-multiple-output, MIMO, communication, (Continued)

wherein the communication device is configured to:
select [e.g., from Ω] one or more preferred beams [e.g., $b_i$]; and
find one or more other beams [e.g., those such that $INR_k(c_l)>\varepsilon_1$] which have a comparatively high spatial correlation with the one or more preferred beams or which have a comparatively high probability of interference with the one or more preferred beams [e.g., if $INR_k(c_l)>\varepsilon_1$],
wherein the communication device is configured to provide, to a coordinating communication device [e.g., BS, gNB]:
first information [e.g., $F_{k,1}$] identifying the one or more preferred beams [e.g., $F_{k,1}$ is made of columns identifying the preferred beams]; and
second information [e.g., $r_{k,i,1}$, $r_{k,i,2}$] identifying the one or more found other beams or a region [e.g., shape] in a map of beams comprising the one or more found other beams.

17 Claims, 8 Drawing Sheets

Related U.S. Application Data continuation of application No. PCT/EP2019/058912, filed on Apr. 9, 2019.

(51) Int. Cl.

| | |
|---|---|
| ***H04B 7/08*** | (2006.01) |
| ***H04W 72/044*** | (2023.01) |
| ***H04W 72/541*** | (2023.01) |

(58) Field of Classification Search
USPC ........................................................ 375/267
See application file for complete search history.

(56) References Cited

U.S. PATENT DOCUMENTS

| | | | | |
|---|---|---|---|---|
| 2010/0085917 | A1 | 4/2010 | Gorokhov et al. | |
| 2013/0064129 | A1 | 3/2013 | Koivisto et al. | |
| 2013/0128764 | A1 | 5/2013 | Lee et al. | |
| 2014/0177561 | A1 * | 6/2014 | Yu | H04W 72/23 370/329 |
| 2015/0282122 | A1 | 10/2015 | Kim | |
| 2016/0056871 | A1 * | 2/2016 | Kakishima | H04B 7/0634 370/336 |
| 2016/0135180 | A1 | 5/2016 | Yuan et al. | |
| 2017/0063503 | A1 * | 3/2017 | Liu | H04L 5/0048 |
| 2017/0105223 | A1 | 4/2017 | Zhang et al. | |
| 2018/0006703 | A1 * | 1/2018 | Kim | H04B 7/0639 |

FOREIGN PATENT DOCUMENTS

| | | | | |
|---|---|---|---|---|
| CN | 104396152 A | | 3/2015 | |
| CN | 106465190 A | | 2/2017 | |
| CN | 107005290 A | | 8/2017 | |
| EP | 2 775 634 A2 | | 9/2014 | |
| TW | 201126985 A | | 8/2011 | |
| WO | 2015/147546 A1 | | 10/2015 | |
| WO | WO-2018030510 A1 | * | 2/2018 | H04B 7/0408 |

OTHER PUBLICATIONS

International Search Report and Written Opinion dated May 9, 2020 from PCT/EP2019/057882.
Chinese language office action dated Mar. 14, 2022, issued in application No. CN 201980038646.X.
English language translation of Chinese language office action dated Mar. 14, 2022, issued in application No. CN 201980038646.X.
Chinese language office action dated Jan. 28, 2026, issued in application No. CN 202310306264.9.

* cited by examiner

Figure 1:
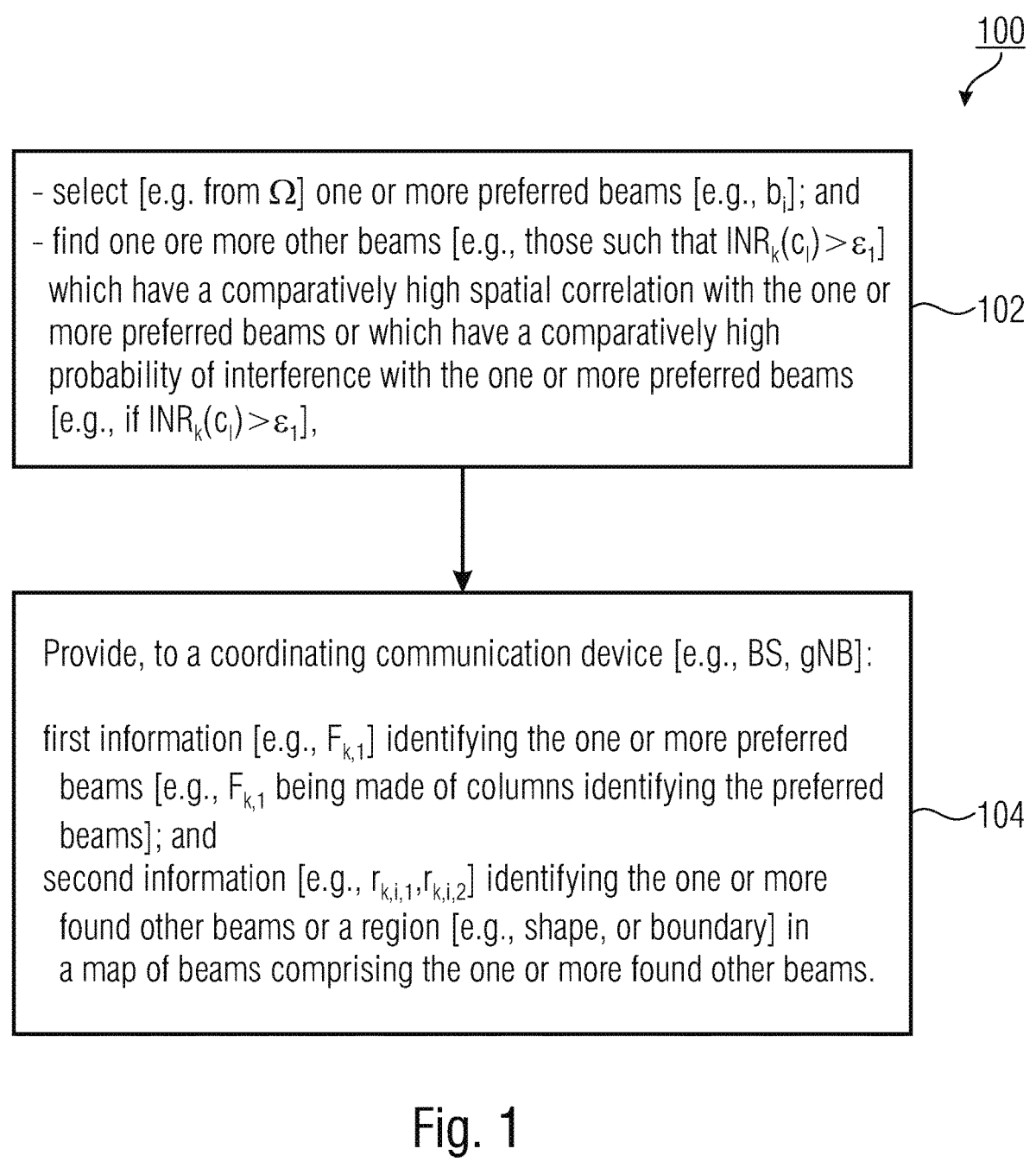

100

- select [e.g. from $\Omega$] one or more preferred beams [e.g., $b_i$]; and
- find one ore more other beams [e.g., those such that $INR_k(c_l)>\varepsilon_1$] which have a comparatively high spatial correlation with the one or more preferred beams or which have a comparatively high probability of interference with the one or more preferred beams [e.g., if $INR_k(c_l)>\varepsilon_1$],

102

Provide, to a coordinating communication device [e.g., BS, gNB]:

first information [e.g., $F_{k,1}$] identifying the one or more preferred beams [e.g., $F_{k,1}$ being made of columns identifying the preferred beams]; and
second information [e.g., $r_{k,i,1}$,$r_{k,i,2}$] identifying the one or more found other beams or a region [e.g., shape, or boundary] in a map of beams comprising the one or more found other beams.

Communication device [e.g., UE] for communicating with one or more other communication devices using a multiple-input-multiple-output, MIMO, communication, configured to:

- select [e.g. from $\Omega$] one or more preferred beams [e.g., $b_i$]; and
- find one ore more other beams [e.g., those such that $INR_k(c_l) > \varepsilon_1$] which have a comparatively high spatial correlation with the one or more preferred beams or which have a comparatively high probability of interference with the one or more preferred beams [e.g., if $INR_k(c_l) > \varepsilon_1$],
- provide, to the coordinating communication device [e.g., BS, gNB]:
  - first information [e.g., $F_{k,1}$] identifying the one or more preferred beams [e.g., $F_{k,1}$ is made of columns identifying the preferred beams]; and
  - second information [e.g., $r_{k,i,1}, r_{k,i,2}$] identifying the one or more found other beams or a region [e.g., shape, or boundary] in a map of beams comprising the one or more found other beams.

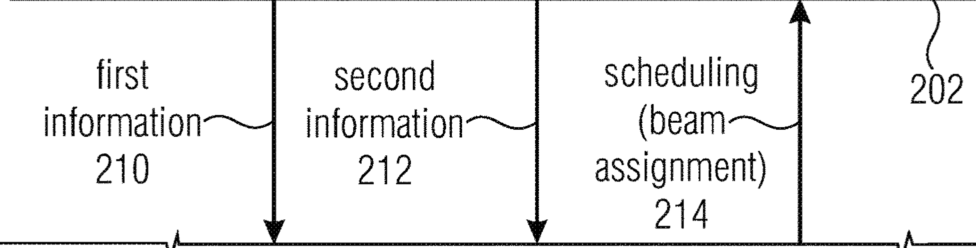

Fig. 2a

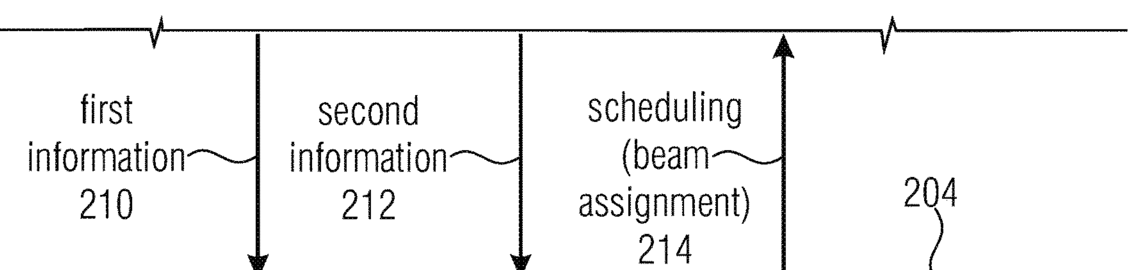

Coordinate communication device [e.g., BS, gNB] for communicating with one or more other communication devices using a multiple-input-multiple-output, MIMO, communication, configured to:

- obtain, from one or more of a plurality of the other communication devices [e.g., UEs]:
  - first information [e.g., $F_{k,1}$] identifying one or more preferred beams [e.g., $b_i$]; and
  - second information [e.g., ellipse ($r_{k,i,1}$,$r_{k,i,2}$)] identifying one or more other beams which have a comparatively high spatial correlation with the one or more preferred beams [e.g., $b_i$] or which have a comparatively high probability of interference with the one or more preferred beams from each of a plurality of communicating communication devices; and
- assign beams to the communicating communication devices [e.g., UEs] considering the first information [e.g., $F_{k,1}$] and the second information [e.g., ellipse ($r_{k,i,1}$,$r_{k,i,2}$)]

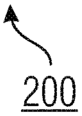

200

Fig. 2a (Con't)

400

1. The UE selects N beams $b_i \in \Omega$, $i=1, \ldots, N$ to construct $F_{k,1}$ and $F_{k,2}$, respectively, and calculates the precoder matrix $FK = F_{k,1}F_{k,2}$. — 401

2. The UE calculates the $SNR_k$ value for MCS selection at the gNB, [rank-1 transmission considered here, extension to higher-rank transmission ist straightforward] — 402

$$SNRk = \frac{|g_k^H H_k^H F_{k,1} F_{k,2}|^2}{\sigma_k^2}$$

3. [define beam clusters for all or selected beams in $F_{k,1}$] For each beam $b_i$ in $F_{k,1}$, the UE finds all beams $c_l \in \Omega$ ($c_l \neq b_i$) in close vicinity of $b_i$, where $INR_k(c_l) > \varepsilon_1$ (or $INR_k(c_l)/SNR_k > \varepsilon_1$) with $\varepsilon_1$ being a threshold value. — 403

4. The UE calculates distance parameters $r_{k,i} = [r_{k,i,1}, r_{k,i,2}]$ of the corresponding ellipse of each beam $b_i$ (other geometrical shapes are possible) (see Fig. 1). — 404

5. For the remaining beams in the codebook $\Omega$, the UE finds a set of M representative beams $d_l \in \Omega$, $l=1, \ldots M$ and calculates their corresponding INR values $INR_k(d_l)$(or relative INR values). The representative beams are selected such that their INRs or relative INRs are the highest around their neighboring beams. — 405

6. Similar to step 3, the UE may find all beams $c_l \in \Omega$ ($d_l \neq c_l$) in close vicinity of $d_l$, where $INR_k(c_l) > \varepsilon_2$ (or $INR_k(c_l)/INR_k(d_l) > \varepsilon_2$) with $\varepsilon_2$ being a threshold value. — 406

7. Similar to step 4, the UE calculates the distance parameters $r_{k,l} = [r_{k,l,1}, r_{k,l,2}]$ of the corresponding ellipses for all $l=1, \ldots, M$. — 407

8. UE feeds back the set of parameters: $SNR_k$, $F_{k,1}$, $F_{k,2}$, $r_{k,i}$, $i=1, \ldots, N$ and $(d_l, r_{k,l})$, $l=1, \ldots, M$. — 408

Communication device [UE] obtaining:

- first signalling information (510) identifying the one or more requested beams in the region; and
- second signalling information (512) identifying a region [shape] in a map of beams (300) comprising the one or more requested beam, the UE evaluating or estimating:

- interference information [$INR_k(c_l)$] associated to beams [$c_l$](301) [e.g., different from the one or more requested beams]; and:
    - on the basis of the evaluated or estimated interference information, retrieve at least the highest interfering beam (514) and signal the at least the highest interfering beam to the coordinating communication device; and/or
    - on the basis of the evaluated or estimated interference information, retrieve information (516) on the interference within the region identified by the second signalling information

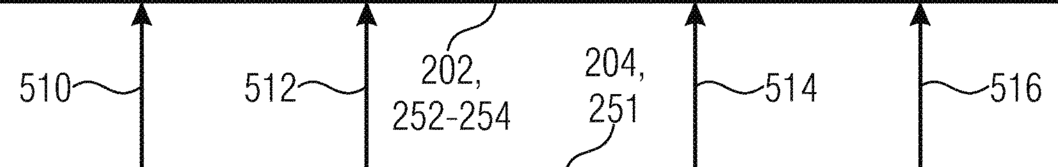

Coordinating communication device [BS, gNB] (204, 251) signaling:

- first signalling information (510) identifying one or more requested beams; and
- second signalling information (512) identifying a region [shape] in a map of beams (300) comprising the one or more requested beam,

Fig. 5

COMMUNICATION DEVICES, COMMUNICATION COORDINATING DEVICES, AND COMMUNICATION METHODS

CROSS-REFERENCES TO RELATED APPLICATIONS

This application is a continuation of copending U.S. patent application Ser. No. 17/065,640, filed Oct. 8, 2020, now U.S. Pat. No. 11,817,920 which is incorporated herein by reference in its entirety, which in turn is a continuation of copending International Application No. PCT/EP2019/058912, filed Apr. 9, 2019, which is incorporated herein by reference in its entirety, and additionally claims priority from European Application No. EP 18166602.5, filed Apr. 10, 2018, which is incorporated herein by reference in its entirety.

1. TECHNICAL FIELD

The present document relates to examples of communication devices (e.g., user equipments, US), e.g., for communicating with one or more other communication devices, e.g., using a multiple-input-multiple-output, MIMO, communication, e.g., a multi-user MIMO, MU-MIMO, communication.

The present document also relates to coordinating communication devices (BS, gNBs) for communicating with one or more other communication devices using a multiple-input-multiple-output, MIMO, communication, e.g., a multi-user MIMO, MU-MIMO, communication.

The communications may be carried out, for example, using devices which have multi-antenna arrays and/or which may perform uplink (UL) and/or downlink (DL) beamed transmissions using spatial codes (e.g., obtained from a known codebook).

BACKGROUND OF THE INVENTION

1.1 Conventional Technology

Conventional technology comprises the following disclosures:

[1] 3GPP TR 36.897 V13.0.0, "3rd Generation Partnership Project; Technical Specification Group Radio Access Network; Study on elevation beamforming/Full-Dimension (FD) Multiple Input Multiple Output (MIMO) for LTE (Release 13)," June 2015.

[2] J. Nam et. al, "Method for multi-input multi-output communication in large-scale antenna system," KR/EP/US patent (U.S. Ser. No. 14/200,557, EP 2775634A3).

Multi-user (MU) MIMO has been a main driver to improve the spectral efficiency of wireless communication systems including LTE and WiFi. However, the current MU-MIMO in LTE still does not provide a significant performance improvement compared to the performance of single-user MIMO. Main reasons for the poor MU-MIMO performance in LTE can be characterized as follows:

1. Coarse limited CSI feedback
   Only a small amount of CSI quantization bits is allowed due to feedback overhead
2. Scheduling loss
   difficult to find a good subset of users because there is no actual information on mutual inter-user interference
3. Link adaptation losses
   Link adaptation implies that, according to the estimated SINR, a user k selects a CQI which corresponds to a desired MCS. This selection usually aims for a certain block error rate (BLER). The smaller the difference between the estimated and true SINR, the smaller the link-adaptation loss. There are two types of link-adaptation loss.
   First, if the estimated SINR is larger than the true SINR the BLER increases and reduces the realized data-rate.
   Second, if the estimated SINR is lower, than a lower data-rate is realized than possible by the channel link capacity.
   In LTE, users report their CQI based on the estimated SNR resulting to average realized data rates much lower than theoretically possible.

While the above first two factors are well understood in both academy and industry, the third aspect has not been properly addressed and has been actually ignored.

2. THE PRESENT INVENTION

Summary

An embodiment may have a communication device for communicating with one or more other communication devices using a multiple-input-multiple-output, MIMO, communication, wherein the communication device is configured to:
- select one or more preferred beams; and
- find one or more other beams which exhibit a comparatively high spatial correlation with the one or more preferred beams or which exhibit a comparatively high probability of interference with the one or more preferred beams, wherein the communication device is configured to provide, to a coordinating communication device:
- first information identifying the one or more preferred beams; and
- second information identifying the one or more found other beams or a region in a map of beams having the one or more found other beams.

Another embodiment may have a communication device for communicating with one or more other communication devices using a multiple-input-multiple-output, MIMO, communication, wherein the communication device is configured to acquire, from a coordinating communication device:
- first signalling information identifying the one or more requested beams in the region; and
- second signalling information identifying a region in a map of beams having the one or more requested beam, wherein the communication device is configured to perform the following operations in the region identified by the second signalling information:
- evaluate or estimate interference information associated to beams; and:
  - on the basis of the evaluated or estimated interference information, retrieve at least the highest interfering beam and signal the at least the highest interfering beam to the coordinating communication device; and/or
  - on the basis of the evaluated or estimated interference information, retrieve information on the interference within the region identified by the second signalling information and provide it to the coordinating communication device.

Yet another embodiment may have a coordinating communication device for communicating with one or more other communication devices communication device using a multiple-input-multiple-output, MIMO, communication, wherein the coordinating communication device is configured to:

acquire, from one or more of a plurality of the other communication devices:

first information identifying one or more preferred beams; and second information identifying one or more other beams which exhibit a comparatively high spatial correlation with the one or more preferred beams or which exhibit a comparatively high probability of interference with the one or more preferred beams from each of a plurality of communicating communication devices; and assign beams to the communicating communication devices considering the first information and the second information.

Yet another embodiment may have a coordinating communication device for communicating with a communication device using a multiple-input-multiple-output, MIMO, communication, wherein the coordinating communication device is configured to signal:

first signalling information identifying one or more requested beams; and second signalling information identifying a region in a map of beams having the one or more requested beam, wherein coordinating communication device is configured to receive from the communication device:

evaluated or estimated interference information associated to beams in the region; and:

at least the highest interfering beam in the region region identified by the second signalling information; and/or information on the interference within the region identified by the second signalling information.

According to another embodiment, a method may have the steps of: selecting one or more preferred beams; and finding one or more other beams which exhibit a comparatively high spatial correlation with the one or more preferred beams or which exhibit a comparatively high probability of interference with the one or more preferred beams, retrieving: first information identifying the one or more preferred beams; and second information identifying the one or more found other beams or a region in a map of beams having the one or more found other beams.

According to another embodiment, a method may have the steps of: first signalling information identifying one or more requested beams in the region; and second signalling information identifying a region in a map of beams having the one or more requested beam, evaluating or estimating interference information associated to beams; and: on the basis of the evaluated or estimated interference information, retrieving at least the highest interfering beam and signal the at least the highest interfering beam to the coordinating communication device; and/or on the basis of the evaluated or estimated interference information, retrieving information on the interference within the region identified by the second signalling information and provide it to the coordinating communication device.

According to an aspect, there is provided a communication device for communicating with one or more other communication devices using a multiple-input-multiple-output, MIMO, communication, wherein the communication device is configured to:

select one or more preferred beams; and find one or more other beams which have a comparatively high spatial correlation with the one or more preferred beams or which have a comparatively high probability of interference with the one or more preferred beams, wherein the communication device is configured to provide, to a coordinating communication device:

first information identifying the one or more preferred beams; and second information identifying the one or more found other beams or a region in a map of beams comprising the one or more found other beams.

According to an aspect, there is provided a communication device for communicating with one or more other communication devices using a multiple-input-multiple-output, MIMO, communication, wherein the communication device is configured to obtain, from a coordinating communication device:

first signalling information identifying the one or more requested beams in the region; and second signalling information identifying a region in a map of beams comprising the one or more requested beam, wherein the communication device is configured to perform the following operations in the region identified by the second signalling information:

evaluate or estimate interference information associated to beams; and:

on the basis of the evaluated or estimated interference information, retrieve at least the highest interfering beam and signal the at least the highest interfering beam to the coordinating communication device; and/or on the basis of the evaluated or estimated interference information, retrieve information on the interference within the region identified by the second signalling information and provide it to the coordinating communication device.

The communication device may be as above.

The communication device may be configured to:

evaluate or estimate interference information associated to beams different from the one or more preferred beams;

on the basis of the evaluated or estimated interference information, define a boundary or a geometrical figure or shape in association with at least one of the one or more preferred beams; and provide information of the boundary or geometrical figure in association with the at least one of the one or more preferred beams as second information.

The communication device may be configured to define the boundary or geometrical shape so as to contain or comprise the found other beams.

The communication device may be configured to define the boundary or geometrical shape such that an extension of the boundary or of the geometrical shape depends on a number of other beams found in an environment of a respective preferred beam.

The communication device may be configured to define the boundary or geometrical shape so as to depend on location of the other beams found in an environment of a respective preferred beam.

The communication device may be configured to define the boundary or geometrical shape such that geometrical parameters describe a shape in a map of beams, wherein the shape is determined in dependence on the found other beams.

The communication device may be configured to define the boundary or geometrical shape such that all the found other beams are included within a boundary or geometrical shape.

The communication device may be configured to:

define the boundary or geometrical figure as an ellipse or ellipsoid having a first and a second parameters and containing at least one of the preferred beams; and provide the first and second dimensions of the ellipse or ellipsoid as the information of the boundary or geometrical figure.

The communication device may be configured to:

define the boundary or geometrical figure with a surficial or solid shape so as to have at least one parameter which defines its surficial or special extension and/or position; and provide the first and second dimensions of the boundary or geometrical figure as the information of the boundary or geometrical figure.

The communication device may be configured to:

evaluate or estimate interference information associated to beams different from the one or more preferred beams to find the one or more other beams.

The communication device may be configured to:

verify whether interference information is greater than a first threshold to find the one or more other beams.

The communication device may be configured to:

restrict the verification of the interference information, with the first threshold to beams comparatively close to the one or more preferred beams.

The first threshold may be obtained from the coordinating communication device.

The communication device may be configured to:

evaluate or estimate interference information for beams which are not the preferred beams;

retrieve the highly interfering or highly spatially correlated beams which maximize the interference with the preferred beams;

on the basis of the evaluated or estimated interference information, define a second boundary or a geometrical figure or shape in association with at least one of the one or more highly interfering or highly spatially correlated beams; and provide information of the second boundary or geometrical figure in association with the at least one of the one or more highly interfering or highly spatially correlated beams as second information.

The communication device may be configured to define the second boundary or geometrical shape such that an extension of the boundary or of the geometrical shape depends on a number of other beams found in an environment of a highly interfering or highly spatially correlated beam.

The communication device may be configured to define the second boundary or geometrical shape so as to depend on location of the other beams found in an environment of a highly interfering or highly spatially correlated beam.

The communication device may be configured to define the second boundary or geometrical shape such that geometrical parameters describe a shape in a map of beams, wherein the shape is determined in dependence on the found other beams.

The communication device may be configured to define the second boundary or geometrical shape such that all the found other beams are included within a second boundary or geometrical shape.

The communication device may be configured to:

define the second boundary or geometrical figure as an ellipse or ellipsoid having a first and a second parameters and containing at least one of highly interfering or highly spatially correlated beam; and provide the first and second dimensions of the ellipse or ellipsoid as the information of the second boundary or geometrical figure.

The communication device may be configured to:

define the second boundary or geometrical figure with a surficial or solid shape so as to have at least one parameter which defines its surficial or special extension and/or position; and provide the first and second dimensions of the boundary or geometrical figure as the information of the second boundary or geometrical figure.

The communication device may be configured to:

obtain a list of preferred beams;

cluster different preferred beams according to their spatial correlation or probability of interference with the one or more preferred beams; and provide, to the coordinating communication device:

information on the list of preferred beams as the first information; and information identifying the clustered beams and/or describing a clustering as the second information.

According to an aspect, there is provided a coordinating communication device for communicating with one or more other communication devices communication device using a multiple-input-multiple-output, MIMO, communication, wherein the coordinating communication device is configured to:

obtain, from one or more of a plurality of the other communication devices:

first information identifying one or more preferred beams; and second information identifying one or more other beams which have a comparatively high spatial correlation with the one or more preferred beams or which have a comparatively high probability of interference with the one or more preferred beams from each of a plurality of communicating communication devices; and assign beams to the communicating communication devices considering the first information and the second information.

The communication device may be configured to:

assign beams to the other communication devices according to the first information and second information so as to advantageously assign the preferred beams to each of the other communication devices and to advantageously avoid to assign beams identified in the second information obtained from a first other communication device to a second other communication device;

signal the assignments to the communicating communication devices.

The communication device may be configured to:

assign beams to the communicating communication devices according to the first information so as to advantageously assign the preferred beams to each of the communicating communication devices;

assign beams to the communicating communication devices according to the second information so as to advantageously assign the other beams as identified by the each of the communicating communication devices to the same communicating communication device;

signal the assignments to the communicating communication devices.

According to an aspect, there is provided a coordinating communication device for communicating with a communication device using a multiple-input-multiple-output, MIMO, communication, wherein the coordinating communication device is configured to signal:

first signalling information identifying one or more requested beams; and second signalling information identifying a region in a map of beams comprising the one or more requested beam, wherein coordinating communication device is configured to receive from the communication device:

evaluated or estimated interference information associated to beams in the region; and:

at least the highest interfering beam in the region region identified by the second signalling information; and/or information on the interference within the region identified by the second signalling information.

According to an aspect, there is provided a method comprising:

selecting one or more preferred beams; and finding one or more other beams which have a comparatively high spatial correlation with the one or more preferred beams or which have a comparatively high probability of interference with the one or more preferred beams, retrieving:

first information identifying the one or more preferred beams; and second information identifying the one or more found other beams or a region in a map of beams comprising the one or more found other beams.

According to an aspect, there is provided a method comprising:

first signalling information identifying one or more requested beams in the region; and second signalling information identifying a region in a map of beams comprising the one or more requested beam, evaluating or estimating interference information associated to beams; and:

on the basis of the evaluated or estimated interference information, retrieving at least the highest interfering beam and signal the at least the highest interfering beam to the coordinating communication device; and/or on the basis of the evaluated or estimated interference information, retrieving information on the interference within the region identified by the second signalling information and provide it to the coordinating communication device.

The UE may be configured to perform INR measurement on the basis of an unprecoded Channel State Information reference symbol, CSI-RS, received from the coordinating communication device.

The coordinating communication device of any may be configured to transmit an unprecoded CSI-RS transmission.

3. BRIEF DESCRIPTION OF THE DRAWINGS

Embodiments of the present invention will be detailed subsequently referring to the appended drawings, in which:

FIG. 1 shows a method according to an example.

FIGS. 2*a* and 2*b* show systems according to examples.

FIGS. 4-6 show a methods according to examples.

DETAILED DESCRIPTION OF THE INVENTION

4. EXAMPLES

Figure 2B:
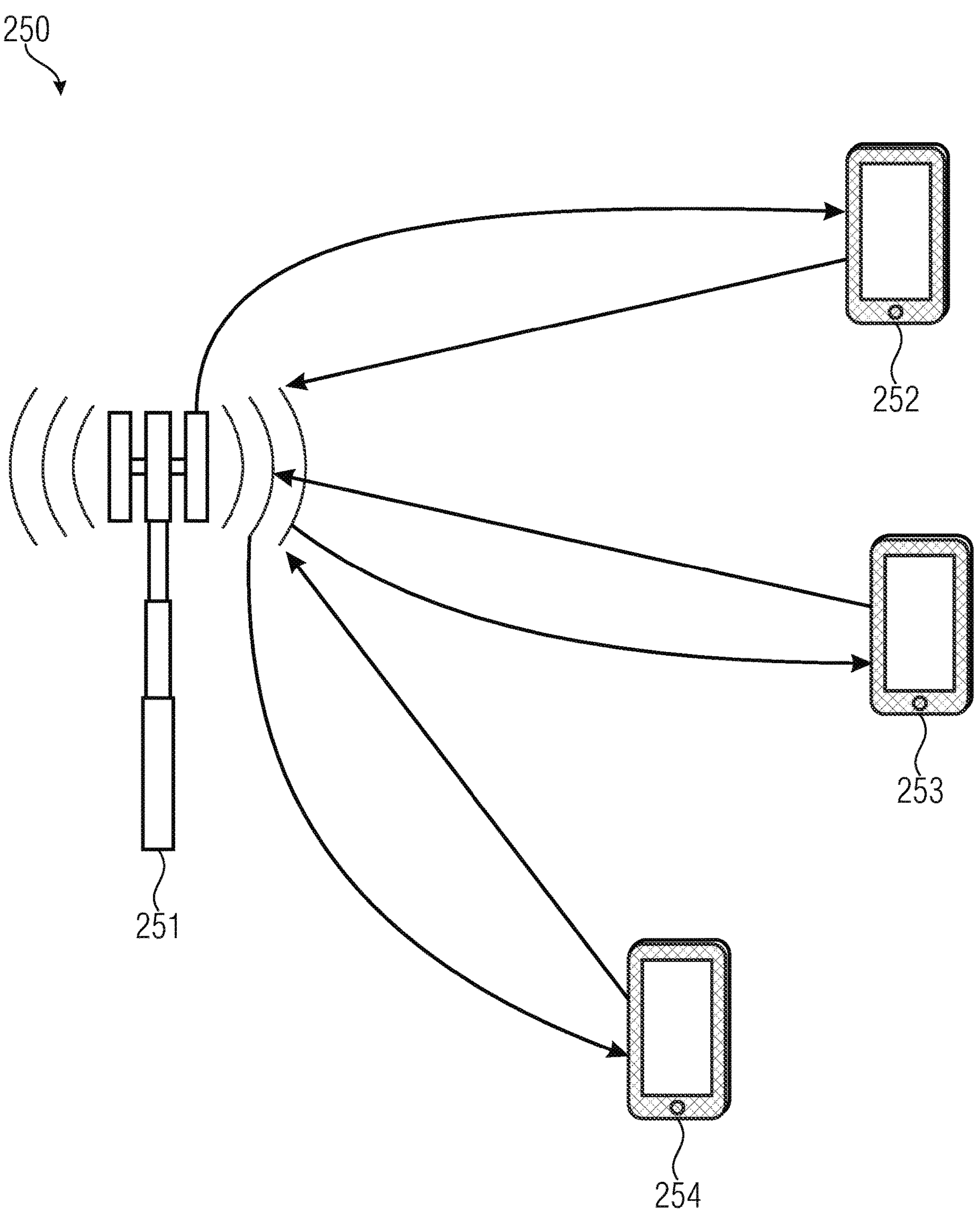

For the present devices, apparatus, systems, methods, hardware, functions, operations and procedures, reference is made to communications which may be, for example, wireless communications. For example, radio frequency, RF, transmissions may be used for the communications or at least part thereof. For example, ultrasound transmissions may be used for the communications or at least part thereof.

FIG. 1 shows a method 100. The method 100 may be for operating a user equipment, UE. The method 100 may be for communicating with one or more other communication devices using a multiple-input-multiple-output, MIMO, communication. The communication device (e.g., UE) may be configured to perform a step 102 of:

selecting one or more preferred beams; and finding one or more other beams which have a comparatively high spatial correlation with the one or more preferred beams or which have a comparatively high probability of interference with the one or more preferred beams.

The communication device may be configured to perform a second step 104 of providing, to a coordinating communication device (e.g., BS or coordinator):

first information identifying the one or more preferred beams; and second information identifying the one or more found other beams or a region (e.g., shape, e.g., within a boundary) in a map of beams comprising the one or more found other beams.

FIG. 2*a* shows a system 200 according to the examples. The system 200 may comprise, for example, at least one communication device 202 (e.g., UE). A plurality of communication devices may also be provided. The at least one communication device 202 may perform the method 100.

The system 200 may comprise a coordinating communication device 204 (e.g., BS or coordinator). The coordinating communication device 204 may receive from the at least one communication device 202, for example:

first information 210, identifying one or more preferred beams that the device 202 prefers for the communication; and second information 212, e.g., identifying one or more found other beams or a region (e.g., shape, e.g., contained or comprised in a boundary) in a map of beams comprising the one or more found other beams.

The first and second information 210, 212 may therefore be provided to the coordinating communication device 204 by the at least one communication device 202, in example, by operating according to method step 104.

On the basis of the first and second information 210 and 212, the coordinating communication device 204 may proceed to schedule the communications. Notably, the coordinating communication device 204 may obtain the first and second information 210 and 212 from a plurality of communication devices 202, and proceed to the scheduling accordingly. Hence, the coordinating communication device 204 may operate with the goal of reducing the interferences between the different communication devices 202, e.g., by assigning, advantageously, the preferred beams as requested in the first information 210 and advantageously discarding the beams indicated in the second information 212.

FIG. 2*b* shows a system 250 (which in some embodiments may be or include the system 200) according to the invention. A coordinating communication device 251 (e.g., BS, which may be a gNB, etc., or a coordinator), which may be the same of the device 204, may communicate (transmitting in DL, and/or receiving in UL) with a plurality of other communication devices 202, e.g., UEs 252, 253, 254.

Figure 3:
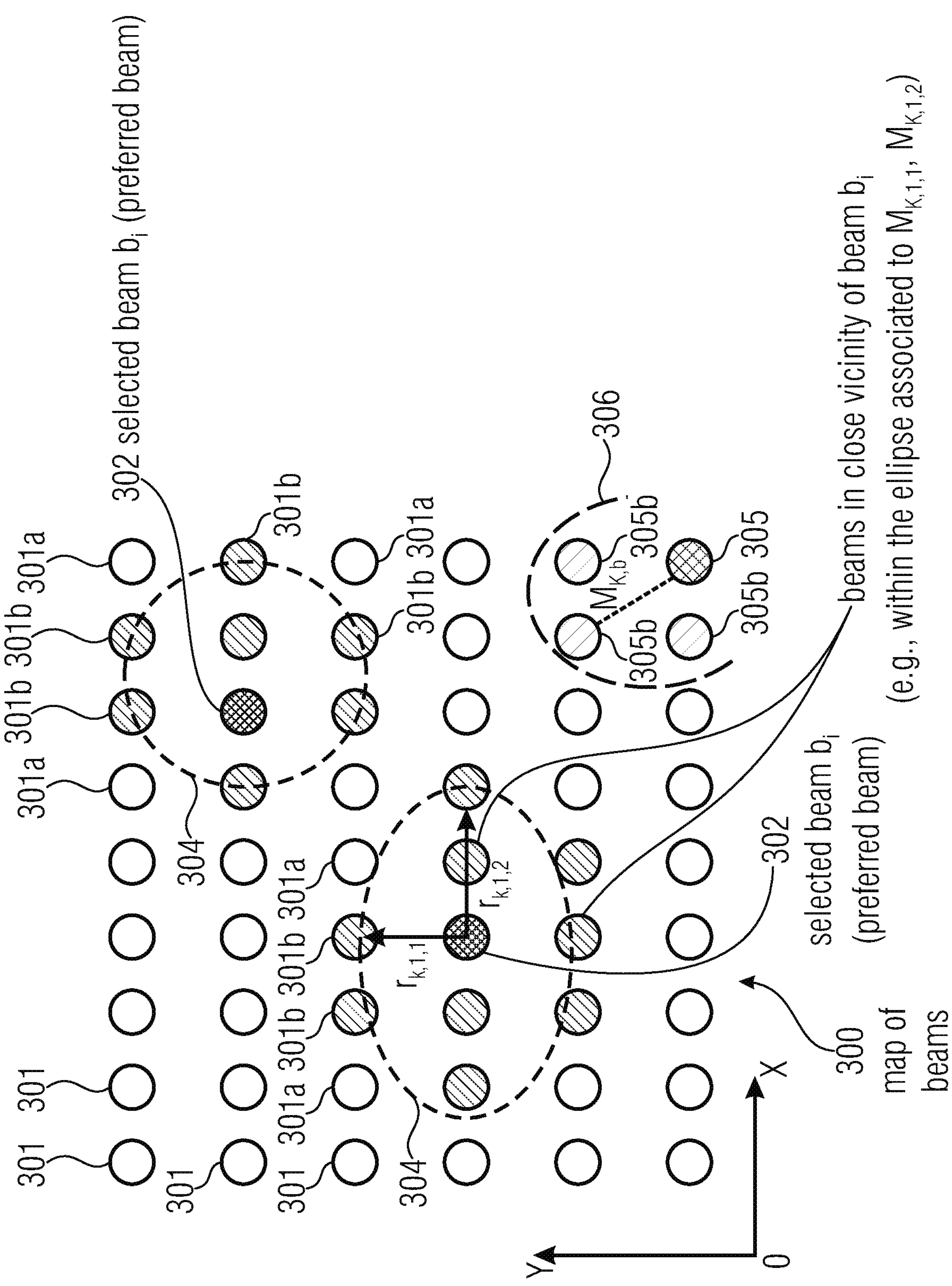
FIG. 3 shows a technique according to an example.

FIG. 3 shows an example of map of beams 300 according to an inventive technique. FIG. 4 shows a method 400 according to the invention. The method 400 may be used to select some of the beams of the map 300, for example.

The map of beams 300 represents the space around the current UE (here identified as the $k^{th}$ UE in a cell of UEs connected to a BS). The current UE, therefore, observes the space and may direct different beams along a plurality of different (e.g., discrete) directions, each direction being associated to a beam in the map 300 (the beams being indicated as 301, 301*a*, 301*b*, 302, 305, and 305*b*, in FIG. 3). The map 300 may be defined with reference to spatial directions (here represented in the spatial axes X and Y, e.g., both originating from the origin O), each direction being associated, for example, to a row and/or column of beams. In some examples, the map may be three-dimensional. The map 300 may be constituted by a plurality of beams, which in FIG. 3 are represented as equally-spaced from each other (non-equally-spaced-beam representations may also be defined). Each beam may be represented, for example, as a vector of dimensions $N_R \cdot N_C$, where $N_R$ is the number of rows of the antenna array and $N_C$ the number of columns of the antenna array, so that the entries of the array correspond to intensities and/or polarizations to be used for the transmission/reception in specific directions. Beams of the map 300 may be grouped in a codebook Ω. The codebook may represent the set of all the $N_R \cdot N_C$, vectors which may be used by the UE for identifying the beams. The numbers of vectors in the codebook can be larger than the number of antennas (e.g., oversampling). In general terms, the larger the codebook, the more effective the present solution. Therefore, the codebook Ω may therefore be understood as corresponding to the map 300.

At step 401, beams 302 of the map 300 (i.e., beams $b_1$, $b_i$, etc., of the codebook Ω) may be selected by the current UE ($k^{th}$ UE). A predetermined number may be chosen by the UE. In examples, the maximum predetermined number may depend on the number of antennas at the UE. In examples, a number of 1 . . . 4 beams per polarization can be combined, e.g., for NR R15 Type-2 CSI.

At step 402, channel indicators (e.g., SU-CQI, single unit channel quality indicator; RI, rank indicator; PMI, precoding matrix index; CQI, channel quality indicator, etc.) may be measured by the UE, e.g., on the basis of a pilot sequence signalled by the BS or coordinator. In particular, the $SNR_k$ (signal to noise ratio associated to the $k^{th}$ UE) may be measured.

Incidentally, it is noted that beams 302 ($b_1$, $b_i$) may be understood as "preferred beams" ("selected beams"), e.g., those beams, in the map 300, which the current UE would like to use for the communications with the BS. The UE may signal the preferred beams 302 as first information 210 which identifies them. For example, the preferred beams may be transmitted as the indexes of a precoder matrix $F_k$.

However, it is not a priori guaranteed that the beams 302 ($b_1$, $b_i$) chosen by the UE will be actually assigned to the UE: there is the possibility that the beams 302 are to be used by different UEs. The current UE has not the knowledge of the status and of the requests set out by the other UEs. The UE has in general not a complete information on the status of the network.

Therefore, it will be the coordinator (e.g., BS) 204 to decide, with the scheduling, which beams will be actually used by each of the UEs. Preferentially (but not with 100% probability), the coordinator will assign to each UE those preferred beams selected by the UE.

It is in general not possible for the UE to deterministically know which, among the beams, will be chosen by the BS, by virtue of the great number of different possibilities (numeric of UEs, positions, interferences, and so on). There arise possibilities that the BS or coordinator does not assign (at least some of) the preferred beams to a UE. Hence, it is advantageous to provide the coordinator with knowledge of "second preferred beams" of each UE. Hence, the BS or coordinator will know, for each UE, other beams which could be selected in case of the selected beams cannot be used by the UE.

Further, there is the need to avoid that the BS assigns to other UEs highly interfering beams, since they would cause large interference with respect to the preferred beam.

To achieve this goals, at step 403 the UE may find one or more other beams which have a comparatively high spatial correlation with the UE's preferred beams 302 and/or which have a high probability of interfering with the UE's preferred beams 302. The UE may therefore provide, for example, a list of the non-selected beams which have a comparatively high spatial correlation or high probability of interfering with the UE's preferred beams 302 (these non-selected beams may be called "clustered beams" or "found other beams"). Therefore, the UE may provide a second information 212 identifying found other beams, in the map 300. The found other beams will be, in some examples, assigned by the coordinator to the UE as a second choice, e.g., when it is not possible to assign the preferred beams 302 to the UE.

For example, for each beam $b_i$ in the precoder matrix $F_{k,1}$, the $k^{th}$ UE may find all beams $c_l \in \Omega$ ($c_l \neq b_i$,) in close vicinity of $b_i$ (e.g., in an environment of the selected beam 302) which fulfil a condition such as $$INR_k(c_l) > \epsilon_1$$

$$\text{(or, in other examples, } INR_k(c_l)/SNR_k > \epsilon_1\text{)},$$

with $\in_1$ being a threshold value (in some examples, $\in_1$ may be signalled by the BS or coordinator). INR may be an evaluation or estimation of the interference to noise ratio associated to the selected beam 302 ($b_i$) and the other beams in the vicinity to the selected beam 302 ($b_i$).

In not always extremely easy to signal a complete list with all the beams $c_l$. In some cases (e.g., with large codebooks), an increase of overhead could be caused.

It has been noted that often, once a preferred beam 302 ($b_i$) is selected, many of the beams which have high probability of interfering with the preferred beam 302 ($b_i$) are actually those beams (indicated with 301*b* in FIG. 3) which are comparatively closer to the preferred beam 302 ($b_i$,). Therefore, it is possible to find these beams 301*b* ($c_l$) in an environment of each preferred beam 302 ($b_i$). The beams of the map 300 which are neither selected beams 302 nor beams 301*b* ($c_l$, beams with high probability of interfering with the selected beams) are indicated with 301*a* in FIG. 3.

The beams 301*b* ($c_l$) are not necessarily "second preferred beams" and do not always represent "second-choice possibilities". The beams 301*b* ($c_l$) may be understood as "highly-interfering beams". The beams 301*b* ($c_l$) may be, for example, beams which, if transmitted simultaneously to the selected beams 302 ($b_i$), would cause high interference. Therefore, the "highly-interfering beams" 301*b* ($c_l$) may be beams which have a comparatively high spatial correlation or high probability of interfering with the UE's preferred beams 302.

Hence, when a highly-interfering beam 301*b* ($c_l$) is signalled to the BS or coordinator, the highly-interfering beam 301*b* ($c_l$) will advantageously be excluded from the scheduling, because of a priority given to the preferred beam 302 ($b_i$). Notwithstanding, the BS or coordinator may choose the highly-interfering beam 301*b* ($c_l$) as second-choice beam in case it will not be possible to schedule the selected beams 302 ($b_i$).

It has been noted that it is highly probable to retrieve many highly-interfering beams 301*b* ($c_l$) in an environment of a selected beam 302 ($b_i$).

Therefore, the UE may signal, as second information 212, information regarding beams 302 ($b_i$) which may have high probability of interfering with the beams 302 ($b_i$). For example, as shown in FIG. 3, it is possible to signal to the BS or coordinator, for each selected beam 302, second information 212 regarding the position of the beams 301*b* ($c_l$) with respect to the selected beam 302 ($b_i$).

For example, the UE may provide an indication of a boundary 304 such that all the beams contained or comprised in the boundary 304 are beams of the type 301*b* ($c_l$).

Instead of directly providing the boundary 304, it is possible, in some embodiments, to indirectly indicate the boundary, e.g., by providing parameters which define the boundary (e.g., giving a relative parameter associated to the selected beam). In some cases, an extension of the boundary may be indicated by the UE. In some examples, for each UE, the set of the beams 301*b* is the set of beams within the boundary 304.

Therefore, at step 404 the UE may find, as the parameter associated to the boundary 304, a radius (e.g., the radius of a circle in the map 300), which may be centered in one of the selected beams 302: the beams that are within the circumference defined by the radius may be understood as beams 301*b*, in some examples. In examples (e.g., for a three-dimensional map), a sphere may be defined (e.g., all the beams within the sphere defined by the radius may be understood as beams 301*b*).

It is possible, instead of a circumference, to define an ellipse as the parameter associated to the boundary 304: the UE may provide two radii $r_{k,i,1}$, $r_{k,i,2}$ which may be understood as the minor axis and/or the major axis of the ellipse, for example (e.g., parallel to the axis Y and X, for example). The beams that are within the ellipse defined by (e.g., associated to) the radius may be understood as beams 301*b*, in some examples. In examples (e.g., for a three-dimensional map), an ellipsoid may be defined (e.g., three axes in three different directions may be provided).

In other examples, instead of ellipses or circumferences, other kinds of shapes (e.g., polygonal shapes) may be used. In some examples, a square or a rectangle may be identified (e.g., its diagonal being indicated as part of the second information 212).

In examples, the extension of the boundary in the map 300 may depend on the number of the found other beams or second preferred beams found in the environment of the selected beam 302. In examples, the more beams are such that $INR_k(c_l) > \in_1$, the broader the boundary 304.

In examples, the boundary or geometrical shape of the group of beams 301*b* may depend on the location of the other beams found in an environment of the beam 302.

The second information 212 (e.g., radius or radii), which regards the beams 301*b*, may therefore be signalled to the coordinator, e.g., in association to the first information 210.

Therefore, the UE, after having measured the INRs of several beams at step 403, step 404 recognizes a figure (e.g., ellipse, circumference) formed by the highly interfering beams. In examples, the UE may find the ellipse (or other figure) which better approximates the group of highly interfering beams.

It has been noted, however, that, besides beams 301*b* ($c_l$), there may be other beams (not necessarily in closed proximity to the beams 302) which are notwithstanding highly interfering with the selected beams 302 ($b_i$) (e.g., due to multipath propagation). These non-proximal highly-interfering beams (indicated as 305 in FIG. 3 and as $d_l$ in step 405) may have the effect of introducing large interference in case of simultaneous transmission with the selected beams 302 ($b_i$). In some cases, the beams 305 ($d_l$) may be assigned, as second-choice beams, from the coordinator to the UE. Hence, at step 405 also these highly interfering beams may be found, e.g., by INR measurements. The $k^{th}$ UE may find a set of M representative beams $d_l \in \Omega$, $l=1, \ldots, M$ and measure their corresponding INR values $INR_k(d_l)$ (or relative INR values). The beams 305 ($d_l$) may be selected such that their INRs or relative INRs are the highest around their neighboring beams.

For example, the beam 305 ($d_l$) shown in FIG. 3 is not a beam in the proximity of any selected beam 302. However, by interference measurements, the UE has recognized it as a highly-interfering beam with one of the selected beams 302. The beam 305 may have a great INR with the selected beam 302 ($b_i$), even if beam 305 ($d_l$) is not within a boundary around the beams 302 ($b_i$). However, by virtue of its high INR with the selected beams 302 ($b_i$), the beam 305 ($d_l$) may also be held as one of the high interfering or highly spatially correlated beams to be signalled to the coordinator with the second information 212. In this case, the UE may transmit the position of the highly interfering beam 305 ($d_l$), as beam 305 ($d_l$) is not within one of the boundaries 304.

After having obtained the beam(s) 305 ($d_l$), at step 406 the UE may also obtain a group of other beams 305*b* which are, for example, within a boundary 306 around the beam 305 ($d_l$). All or at least some of the features of the boundary 304 and the parameters (e.g., radii $r_{k,i,1}$, $r_{k,i,2}$) and the step 404 may be valid, according to examples, for the boundary 306 and step 407. In this case, a radius $r_{k,l}$ (e.g., of a circumference centered in the beam 305) may be defined. For example, the UE may find all beams $c_l \in \Omega$ ($d_l \neq c_l$) in close vicinity of $d_l$, where $INR_k(c_l) > \in_2$ (or $INR_k(c_l)/INR_k(d_l) > \in_2$) with $\in_2$ being a threshold value (which, however, in some examples may be the same of $\in_1$) (in some examples, $\in_1$ and/or $\in_2$ may be signalled by the BS or coordinator, for example). Therefore, the UE may recognize a geometrical figure around the beam 305 and transmit parameters (e.g., parameters relative to the beam 305, such as a radius or radii centered in the beam 305) associated to the beam 305. Hence, the position of the beam 305 ($d_l$) and the information associated to the beams 305*b* ($c_l$) will be signalled, e.g., within the second information 212, to the BS or coordinator, at step 408.

Hence, at step 408 the second information 212 (which identifies, for example, the beams 305 with their position in the map 300 and/or the beams 301*b* and 305 with parameters respectively relative to the beams 302 and 305) may be signalled to the BS or coordinator in association to the first information 210 (which identifies the preferred beams 302).

For example, the BS or coordinator will have knowledge of the fact that, besides the selected beams 302 and the beams 301*b* within the boundaries 304, other groups of beams (e.g., beams 305 and the beams 305*b* within the boundaries 306) have high probability of interfering with the selected beam 302. The highly-interfering beams 301*b*, 305, 305*b* will be used by the BS or coordinator for avoiding the simultaneous transmission with the selected beams 302 and the beams 301*b*, 305, and 305*b*. Accordingly, the coordinator will:

- advantageously schedule the communications so that selected (preferred) beams are assigned to respective UEs; and, in case:
  - for each assigned beam 302, avoid to assign beams 301*b*, 305, 305*b*; or
- in case of impossibility of assigning selected beams 302 to the UE that have signalled them, advantageously schedule the communication so that the UE uses one of the beams 301*b*, 305, and/or 305*b*; and, in case, advantageously avoid to assign other beams 301*b*, 305, 305*b*.

Notably, without this strategy, there could arise the risk, for the coordinator, of choosing beams which interfere with each other, hence increasing mutual interferences and reducing the quality of service. In the cases in which no boundary 304 or no second information 212 on the highly-interfering beams (301*b*, 305, 305*b*) is signalled by the UE to the BS or coordinator, the latter could decide for a scheduling such that multiple highly-interfering beams (301*b*, 305, 305*b*) are to be used simultaneously to the selected beam 302.

In particular when signalling the second information as a parameter associated to the geometrical shape of the group of highly-interfering beams (or spatially correlated beams) 301*b* or 305*b*, the communication will be particularly effective, in particular reducing overhead: no beam-by-beam position will be signalled from the UE to the coordinator, hence minimizing the second information. The coordinator will, notwithstanding, understand the exact position of the beams 301*b*and/or 305*b* based on its knowledge of the map 300, without necessity other information than the position of the beams 302 and/or 305.

Importantly, when searching the boundaries or the geometrical shapes around the beams 302 and 305, the UE may restrict the verification of the interference only to beams within an environment of the beams 302 and 305, e.g., to beams comparatively close to the 302 and 305. For example, a maximum distance of a predetermined number of beams (or a predetermined distance in spatial unit) may be defined: the UE will measure the INR (or other interference-related measurements) only to the beams within the environment. In that case, less processing resources will be needed: beams which are too far away will not be taken into consideration for verifying whether if their INR is greater than $\in_1$ or $\in_2$, for example.

In examples, at least some of the thresholds (e.g., $\in_1$, $\in_2$) with which the INR is compared may be signalled by the BS or coordinator. In particular, this signalling may be provided in the downlink control information. In alternative examples, at least some of the thresholds (e.g., $\in_1$, $\in_2$) may be signaled by each UE to the BS depending if it is cell specific or UE specific. FIG. 5 shows an example of a communication device [e.g., UE] (204, 252-254) for communicating with one or more other communication devices using a multiple-input-multiple-output, MIMO, communication, wherein the communication device [e.g., UE] (204, 252-254) is configured to obtain, from a coordinating communication device [e.g., BS, gNB] (204, 251):

- first signalling information (510) identifying the one or more requested beams (302) in the region; and
- second signalling information (512) [e.g., $r_{k,i,1}$, $r_{k,i,2}$] identifying a region [e.g., shape] in a map of beams (300) comprising the one or more requested beam, wherein the communication device [e.g., UE] (204, 252-254) is configured to perform the following operations in the region identified by the second signalling information:

- evaluate or estimate interference information [e.g., $INR_k(c_l)$] associated to beams [e.g., $c_l$] (301) [e.g., e.g., different from the one or more requested beams]; and:
  - on the basis of the evaluated or estimated interference information, retrieve at least the highest interfering beam and signal the at least the highest interfering beam to the coordinating communication device; and/or
  - on the basis of the evaluated or estimated interference information, retrieve information on the interference within the region identified by the second signalling information and provide it to the coordinating communication device.

FIG. 5 also shows a method 500. FIG. 5 shows a coordinating communication device [e.g., BS, gNB] (204, 251) for communicating with a communication device [e.g., UE] (204, 252-254) using a multiple-input-multiple-output, MIMO, communication, wherein the coordinating communication device [e.g., BS, gNB] (204, 251) is configured to signal:

- first signalling information (510) identifying one or more requested beams (302); and
- second signalling information (512) [e.g., $r_{k,i,1}$, $r_{k,i,2}$] identifying a region [e.g., shape] in a map of beams (300) comprising the one or more requested beam, wherein coordinating communication device is configured to receive from the communication device [e.g., UE] (204, 252-254):

- evaluated or estimated interference information [e.g., $INR_k(c_l)$] associated to beams [e.g., $c_l$] (301) in the region [e.g., e.g., different from the one or more requested beams]; and:
  - at least the highest interfering beam in the region region identified by the second signalling information; and/or
  - information on the interference within the region identified by the second signalling information.

The devices of FIG. 5 may be the same of FIGS. 2*a* and/or 2*b*. They may operate with the map of beam of FIG. 3 in exactly the same way.

Here, it is the coordinating device 204 which signals a first signalling information 510 which may be, for example, one requested beam (which in this implementation is shown as 302 in FIG. 3). The requested beam 302 may be the beam that the coordinating device 204 intends to use, for example, for future communications with the UE, for example.

The coordinating device 204 may also signal a shape (region) in which measurements, estimations and/or evaluations have to be performed by the UE. It has been noted, in fact, that instead of providing a list of beams to be evaluated, it is simply possible to identify one single beam 302 (first signalling information 510) and a geometrical parameter (second signalling information 512) which permits to identify an environment of the single beam. Hence:

the coordinating device request the UE to perform evaluations, measurements, and/or estimations on one beam and, indirectly, on an environment of the beam.

Accordingly, the UE, after having performed the evaluations, measurements, and/or estimations, may signal back information such as the highest information beam within the requested region (information 514) and/or information on interference within the requested region.

This technique is extremely valuable when the technique of FIG. 5 is combined with that of FIG. 2*a*. In fact:

- the coordinating device 204 may signal (e.g., with information 510 and 512) the environment within which the UE will search the one or more preferred beams discussed above;
- the UE may select the one or more the preferred beams and/or the one or more other beams only within the environment of the requested beams;
- therefore, the resulting preferred beams will only be chosen among the beams preferred by both the UE and the coordinating device 204.

In some examples above, when it is referred to "environment of the selected beam 302", it is referred to the "environment in which the selected beam 302 has been chosen" (e.g., with method 500).

5. Discussion

A discussion on the invention is here provided, in particular including further examples and/or other features of the examples above.

Although the LTE/NR RAN-1 society has discussed the introduction of MU-CQI in the downlink since Rel-8, the LTE standard has no defined explicit scheme for MU-CQI, because there was neither an agreement nor significant performance benefit. In current LTE/NR systems, the CSI feedback parameters RI, PMI and CQI (hereafter also referred to as SNR) obtained from the UEs are used at the gNB in a best-effort manner to schedule UE resources and to estimate/predict the UE-specific PMIs and CQIs for link adaptation. The current LTE/NR feedback schemes do not allow the gNB realistically estimating inter-user interference caused by co-scheduled UEs to the same resources, that significantly affects scheduling decisions and UE link adaptation. Existing feedback proposals have no additional feedback mechanism that directly/explicitly assists the scheduling decisions at the gNB. Therefore, both scheduling loss and link adaptation loss are incurred.

In the current LTE/NR feedback scheme, each UE estimates the channel between gNB's and UE antenna ports based on the received reference sequences such as CSI-RS, CRS, etc. The estimated channel is used at the k-th UE to select the channel rank and the precoder/PMI $c_m$, $m \in \mathcal{M}$ that maximizes the k-th UE's SNR (denoted as SU-CQI in the following), $$SNR_k = \max_{m \in \mathcal{M}} \frac{|g_k^H H_k^H c_m|^2}{\sigma_k^2} \tag{1}$$

where $H_k$ is the M×N channel matrix of user k, $g_k$ is the receive filter coefficient vector, $c_m$ is the precoding vector selected from a codebook of size $\mathcal{M}$, and $$\sigma_k^2$$

is the noise plus inter-cell interference. Note that in the case of OFDM-based transmissions, eqn. (1) is obtained for each subcarrier or sub-band; however, for the ease of notation, we skip the subcarrier/sub-band index in the following. Moreover, eqn. (1) assumes a trank-1 transmission; the extension to higher-rank transmissions is straightforward. Rank 1 transmission here means from user perspective. From BS perspective it is a Rank N transmission, where N is the number of spatial multiplexed users. So for example 5 users with Rank 1 transmission results to a total Rank 5 transmission from BS perspective.

With the above UE-specific SU-CQI, the gNB scheduler is not able to estimate the inter-user interference caused by co-scheduled UEs to the same resources. Therefore, several schemes have been proposed that improve performance and reduce the scheduling and link adaption loss. These schemes have in common that each UE obtains multiple SINRs (denoted as MU-CQIs in the following) with respect to a limited number of possible co-scheduled UE pairs as follows:

$$\mathrm{SINR}_k(\mathcal{M}_s) = \frac{|g_k^H H_k^H c_m|^2}{\frac{S}{P}\sigma_k^2 + \sum_{j \in \mathcal{M}_s \setminus m} |g_k^H H_k^H c_m|^2} \tag{2}$$

where $\mathcal{M}_s$ denotes the set indexes of co-scheduled UEs with their respective precoding vectors/matrices. Then, each UE reports the obtained SINRs in terms of MCS to the gNB to support estimating the UE-specific multiple SINRs.

Although, the multiple SINR feedback schemes reduce the scheduling loss, the performance is limited, as the gNB scheduler can only use precoding vectors/matrices from a very limited number of co-scheduled UE combinations to obtain the multiple UE-specific SINRs.

A different MU-CQI scheme known as interference-to-noise (INR) feedback has been proposed in [2]. Instead of obtaining multiple SINRs, each UE obtains multiple INRs and feed backs these values to the gNB.

Let $c_m$ denote the selected PMI of user k. For a codebook having M precoding matrices/vectors, we can then compute (M-1) INRs with respect to PMIs $c_j$ orthogonal to $c_m$, where M is the number of antenna ports per H/V dimension.

$$INR_{k,j} = \frac{|g_k^H H_k^H c_j|^2}{\sigma_k^2},\ j \in \mathcal{M},\ j \neq m. \tag{3}$$

With the INR feedback in (3) and the SU-CQI feedback in (1), the gNB scheduler can obtain multiple SINRs at each UE as follows:

$$\frac{|g_k^H H_k^H c_m|^2}{\frac{S}{P}\sigma_k^2 + \sum_{j \in \mathcal{M}_s \setminus m} |g_k^H H_k^H c_j|^2} = \frac{SNR_k}{\frac{S}{P} + \sum_{j \in \mathcal{M}_s \setminus m} INR_{k,j}}. \tag{4}$$

Wherein P is the power to be split to S individual data streamers/layers. It is important to notice that the scheduler can compute SINRs of all possible combinations of users and precoding vectors (by considering different subsets of users and precoders and a different number of selected users) for the reported SNR and INR feedback from the UEs.

An issue with the above scheme is that there is some uncertainty on link adaptation because the INR feedback depends on a particular assumption on receiver algorithms. However, the current 3GPP MIMO scheme is advantageously transparent to receiver algorithms which are a vendor-specific implementation issue. To avoid that issue, [2] proposed a few modifications.

However, the solution described in [2] only works efficiently for small codebook sizes with, e.g. codebooks from Release 8, but not for Release 15 new RAT (NR) codebooks with a high number of available beams from oversampled DFT matrices. The extension of the INR feedback from [2] to double-structured precoders is given below.

Brief Description of New RAT (NR) Codebooks

The INR feedback scheme is very simple and efficient in the case where the codebook consists of M orthogonal precoding vectors for a rank-1 transmission. In this case, only (M-1) INRs per UE are basically needed for any combination of UEs to be co-scheduled.

However, for the more general dual-stage codebooks based on oversampled DFT-vectors, reporting a single INR for each precoding vector in the codebook would incur a very high complexity feedback in the uplink.

The precoding matrix $F_k$ of the kth user (e.g., 202, 251-253) can be decomposed into a first beam-set matrix $F_{k,1}$ containing a set of beams (e.g., the preferred beams 302), e.g., for different antenna orientations/polarizations, and a second matrix $F_{k,2}$ used for beam-selection and/or beam-combining as $$F_k = F_{k,1} F_{k,2}.$$

Here, the matrix $F_{k,1}$ may be a block-diagonal matrix of size $2N_R N_C \times 2D$ and contain 2D DFT-beams in two blocks, $$F_{k,1} = \begin{bmatrix} s_{k,1}^{(1)} & s_{k,2}^{(1)} & \dots & s_{k,D}^{(1)} & & 0 & & \\ & & 0 & & s_{k,1}^{(2)} & s_{k,2}^{(2)} & \dots & s_{k,D}^{(2)} \end{bmatrix},$$

where each vector $$s_d^{(l)} \in \mathbb{C}^{N_R N_C \times 1}, \; d = 1, 2, \dots, D \; l = 1, 2$$

represents a beam with respect to a certain direction and the l-th antenna polarization. $F_k$ may be provided to the BS or coordinator, for example, as part of the first information 210. The beams $$s_d^{(l)}$$

are the columns of the codebook matrix $\Omega = [a_{1,1} \dots a_{k,l} \dots a_{N_R O_R, N_C O_C}]$, which is typically given by an oversampled DFT matrix of dimension $N_R \cdot N_C \times N_R \cdot N_C \times O_R \cdot O_C$. The codebook $\Omega$ may be parametrized by the number of rows and columns $N_R$ and $N_C$ of the antenna array, respectively, and the corresponding oversampling factors across the particular dimensions ($O_R/O_C$), such that $$a_{k,l} = \frac{1}{\sqrt{N_R \cdot N_c}} a_k^{(R)} \otimes a_l^{(C)}, \; k = 0, 1, \dots, N_R O_R - 1, \; l = 0, 1, \dots, N_C O_C = 1, \tag{5}$$

with $$a_k^{(R)} = \left[ 1 \;\; e^{\frac{j2\pi k}{N_R O_R}} \;\; \dots \;\; e^{\frac{j2\pi k (N_R - 1)}{N_R O_R}} \right]^T \in \mathbb{C}^{N_R \times 1}, \tag{6}$$

$$a_l^{(C)} = \left[ 1 \;\; e^{\frac{j2\pi k}{N_C O_C}} \;\; \dots \;\; e^{\frac{j2\pi k (N_C - 1)}{N_C O_C}} \right]^T \in \mathbb{C}^{N_C \times 1}.$$

Reporting INRs corresponding to every beam in $\Omega$ would result in very costly feedback in uplink.

INR Feedback from [2] with NR Codebooks (Conventional Technology)

In conventional technology [2], the UE selects N beams $b_i \in \Omega$, i=1, . . . , N and co-phasing factors and constructs $F_{k,1}$ and $F_{k,2}$, respectively, and obtainss the precoder vector $F_k = F_{k,1} F_{k,2}$. The selection of beams are UE-implementation specific.

1. Each UE obtains the SU-CQI ($SNR_k$) value for MCS selection at the gNB, [rank-1 transmission considered here, extension to higher-rank transmission straightforward] as $$SNR_k = \frac{|g_k^H H_k^H F_{k,1} F_{k,2}|^2}{\sigma_k^2}.$$

2. For the non-selected beams $c_l \in \Omega$, $c_l \neq b_i$, i=1, . . . , N in the codebook, the UE finds the M beams having the highest INR values or the P highest relative INR values (defined relative to $SNR_k$) among all beams $c_l \neq b_i$, i=1, . . . , N in the codebook $$INR_k(c_l) \equiv \frac{|g_k^H H_k^H c_l|^2}{\sigma_k^2}, \; l = 1, \dots, P,$$

$$\hat{c}_L = \underset{\substack{c_l \in \Omega, c_l \neq b_i, i=1,..,N \\ c_l \neq \hat{c}_k, k=1-1, k=l-2,\dots,k-1}}{\operatorname{argmax}} INR_k(c_l),$$

3. Each UE feed backs the following parameters to the gNB: SU-CQI ($SNR_k$), PMI(s) to specify beams and combining coefficients of $F_{k,1}$, $F_{k,2}$ and $INR_k(\hat{c}_l)$, l=1, . . . , M with corresponding beam indexes l.

Disadvantage of this approach: Neighboring beams of $b_i$ in $F_{k,1}$ are selected with high probability in step 3. This does not help the gNB in finding suitable combinations of users for MU-transmission.

Accordingly, for INR feedback, we need to limit the codebook size by using codebook subset restriction using DCI, MAC, or RRC signaling. Another way to avoid the costly feedback overhead would be to use offset values to representative INRs for a particular oversampling and/or co-phasing factor. This presumes possible INR correlation between different oversampling and/or co-phasing factors.

INR Feedback Reduction by Beam Clustering for Large Oversampled Codebooks (Examples According to the Present Solution)

Solution 1:

At least one (or more, or the complete sequence) of steps as the following ones may be performed (reference to FIG. 4) by the UE 202 or 151-153:

1. (step 401) The UE may select N beams $b_i \in \Omega$, i=1, . . . , N (the beams $b_i$ being the selected or preferred beams 302, and $\Omega$ corresponding to the map 300) to construct $F_{k,1}$ and $F_{k,2}$, respectively, and obtains the precoder vector $F_k=F_{k,1}F_{k,2}$ (which will be part of the first information 210). The selection of beams 302 and co-phasing factors are UE-implementation specific, but are in general directed at finding the best beams for the communication (e.g., those which maximize SNR).
2. (step 402) The UE measures or estimates or evaluates SNR values, such as the $SNR_k$ value for MCS selection at the gNB (or BS or coordinator), [rank-1 transmission considered here, extension to higher-rank transmission is straightforward] for example:

$$SNR_k = \frac{|g_k^H H_k^H F_{k,1} F_{k,2}|^2}{\sigma_k^2}.$$

3. (step 403) [define beam clusters for all or selected beams in $F_{k,1}$] For each beam $b_i$ in $F_{k,1}$, the UE may find all beams $c_l \in \Omega$ ($c_l \neq b_i$,) in close vicinity of $b_i$, where $INR_k(c_l) > \in_1$ (or $INR_k(c_l)/SNR_k > \in_1$) with $\in_1$ being a threshold value (hence retrieving the beams 301*b* which are in close proximity to the beams 302, forming, for example, a connected group of beams 301*b* which is highly interfering or highly spatially correlated with the beam 302).
4. (step 404) The UE finds distance parameters $r_{k,i}=[r_{k,i,1}, r_{k,i,2}]$ (or radii of circumferences, or other geometrical parameters, e.g., parameters related to the beams 302 or $b_i$) of the corresponding ellipse of each beam 302 or $b_i$ (other geometrical shapes are possible) (see FIG. 1).
5. (step 405) In some examples, for the remaining beams in the codebook $\Omega$ (map 300), the UE may find a set of M representative beams 305 or $d_l \in \Omega$, l=1, . . . , M and measure or estimate or evaluate interference with the beams 302 or $b_i$. For example, the UE may measure or evaluate or estimate their corresponding INR values $INR_k(d_l)$ (or relative INR values). The representative beams 305 or $d_l$ may be selected such that their INRs or relative INRs are the highest around their neighboring beams (e.g., in the environment of the selected beams 302, there are no beams, with higher interference with the selected beams 302, than the beams 305).
6. (step 406) Similar to step 3 (403), the UE may find all beams $c_l \in \Omega$ ($d_l \neq c_l$) (beams 305*b*) in close vicinity of $d_l$, where $INR_k(c_l) > \in_2$ (or $INR_k(c_l)/INR_k(d_l) > \in_2$) with $\in_2$ being a threshold value (which may be the same of $\in_1$, in some examples).
7. (step 407) Similar to step 4 (404), the UE may obtain distance parameters $r_{k,l}=[r_{k,l,1}, r_{k,l,2}]$ of the corresponding ellipses for all l=1, . . . , M (or other parameters which put in relationship the beams 305*b* with the beams 305).
8. (step 408) The UE may feeds back the set of parameters: $SNR_k$, $F_{k,1}$, $F_{k,2}$, $r_{k,i}$, i=1, . . . , N and ($d_l$, $r_{k,l}$), l=1, . . . , M. For example, the UE may signal first information 210 (including, for example, $F_{k,1}$ and/or $F_{k,1}$) as well as second information 212 (including, for example, $r_{k,i}$, i=1, . . . , N and ($d_l$, $r_{k,l}$), l=1, . . . , M).

FIG. 3 refers to beam clustering with definition of interference regions. Assumption may be made so that the beams shown in FIG. 3 are above the threshold $\in_1$ or $\in_2$.

Further Alternative or Complementary Features (e.g., of the INR Feedback)

The thresholds $\in_1$ and $\in_2$ can be signaled from the BS to the UE (cell specific) or from selected by the UE and signaled to the BS together with the INR feedback Other shapes than a circle or ellipse possible, e.g. squares, rectangles or even 3-dimensional or n-dimensional shapes Report beam indices with respect to the beams within the area defined by the selected beam and the radius that are above. These "relative" beam indices involve less bits than the beam index within the large codebook.

Constraints on the used receive vector $g_k$ signaled from the BS to the user k. E.g. the BS can have side information (a-priori-knowledge) about the interference situation of user k, e.g. from the user position and measurements from the past, or ray-tracing of the environment, or machine learning, or other sources. Thus the INR computation in eqn. (3), may use different receiver filter coefficients $g_k$ constrained by signaling from the BS to the user in the downlink control information (DCI) to improve the performance of the proposed feedback scheme. This could be especially of interest for coordinated multipoint transmsission where multiple gNBs do coordinated beamforming.

Another option is to extend the INR feedback approach to a pair/set of gNB serving their UEs in a coordinated fashion. By applying the before mentioned approach and adding cell-specific identifiers to the INR while exchanging the information between the gNBs, we achieve multi-user interference aware transmission between multiple gNBs and UEs. As a consequence, the DCI should contain information on list of cell-ids for which the UE needs to obtain INR. Alternatively, the UE could decide on its own and needs to feedback this list of cell-ids e.g. to the serving gNB.

Alternatively, effective interference level feedback could be provided in another way, describing the actual inter-beam interference levels seen at the UE receiver:

1. UE may calculate potentials high SNR beam candidates based on RS.
2. UE may create an ordered list of best beam candidates to be reported to eNB/gNB
3. Such candidates may be clustered regarding their crosswise spatial correlation in order to identify the beam combinations which are easier or harder to separate at the receiver side. (remark: beams which are spatially highly correlated at the receiver and at similar receive power levels are very likely to suffer from high inter-beam interference levels.
   a. The correlation can be computed either wide band or narrowband and based on long term (covariance matrix) or short term;
   b. Depending on the scenario, user mobility and targeted performance gains the appropriate correlation metric should be chosen (UE can signal, which type of correlation feedback metric was chosen);
   c. Furthermore, the base station could request a specific kind of feedback from a UE or UE groups (eNB preselects specific users or user groups for joint scheduling on time/frequency resources and requests these to report on such PRB or sub-bands);

4. If knowledge about the applied code book at the base station is available, UE creates a spatial beam correlation pattern where certain beams of the code book have more or less correlation due to spatial correlation at the base station side (e.g. transmit beams might differ only slightly in direction of departure (DoD))
5. UE may obtain effective SINR for certain beam combinations considering a selected MU-transmission rank.
   a. Group beam combinations (preferred serving beam and co-used beam for another user in case of rank2) in effective SINR categories representing
      i. A MCS level or
      ii. A MCS level degradation compared to the MCS level to be chosen in SU-MIMO
6. UE may report selected beam groups to base station together with resulting MCS level or MCS level degradation → based on such feedback the scheduler can select user pairs on all spatial resources Briefly summarized:

The UE does not report the N-strongest interfering beams, instead it reports interfering beams which are X dB lower (suitable multi-user beam combinations), and optional the corresponding MCS degradation.

Figure 6:
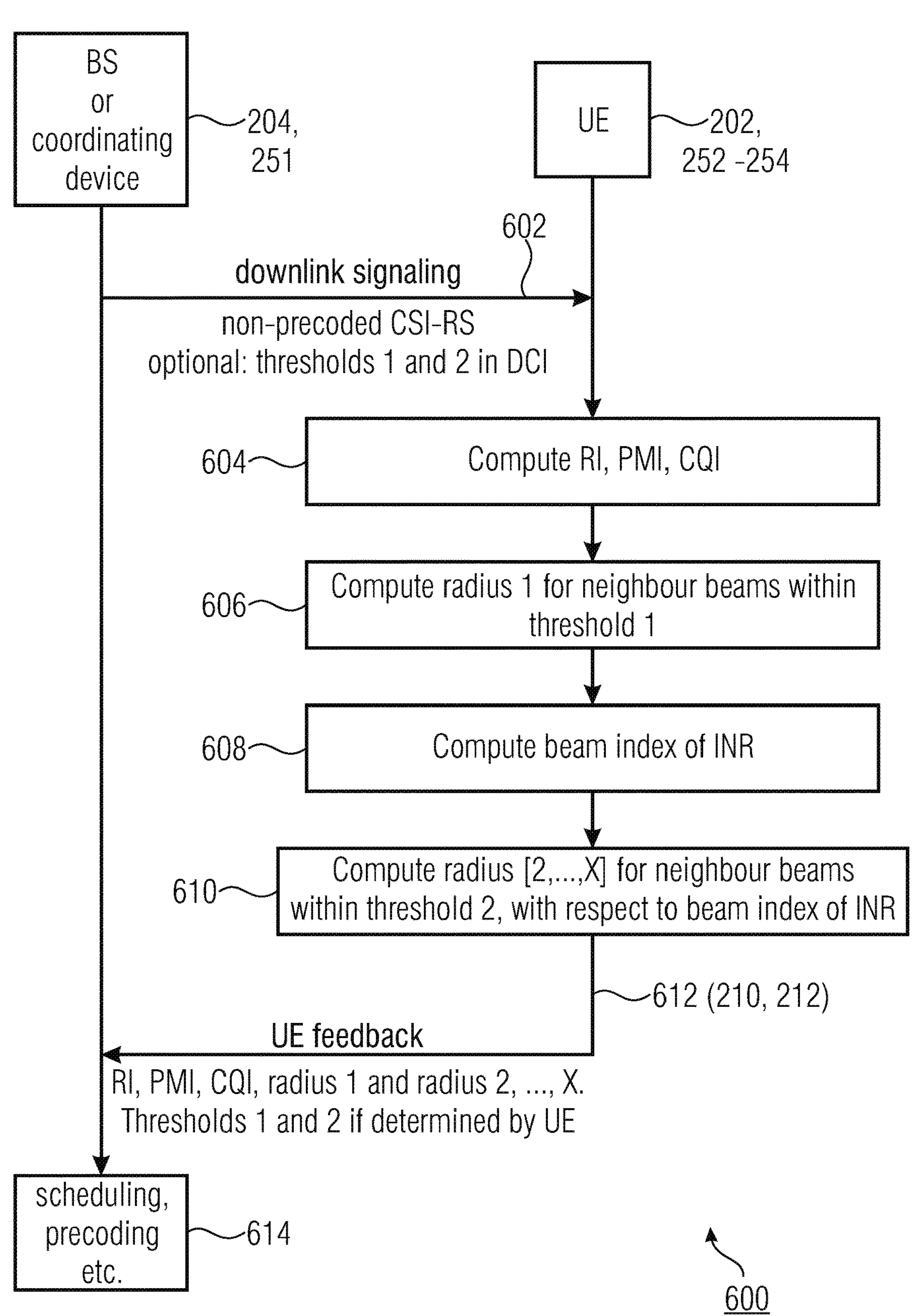

FIG. 6 shows a method 600, which may be between the BS or coordinating device 204, 251 and at least one UE 202, 252-254. Method 600 may comprise, for example, at least some of the steps of method 200, 400, and/or 500. According to method 600:

- at 602, the BS or coordinating device 204, 251 may signal, in DL (download) a non-precoded CSI-RS, and/or thresholds (e.g., $\in_1$, $\in_2$ as discussed above); and/or
- at 604, the UE may obtain RI, PMI, CQI (e.g., with one of the techniques discussed above); step 604 may comprise, inter alia, at least some of steps 401-403 of method 400; and/or
- at 606, the UE may obtain the second information 210 (e.g., the radius, here indicated as "radius 1", or the axis of the ellipse 304, or any other information, such as geometrical information, relating to the boundary); this may be obtained, in examples, by performing comparisons of INR values with the "threshold 1" (e.g., $\varepsilon_1$ discussed above); and/or
- at 608, the beam indexes of the beams 301*b* (found other beams, e.g., highly interfering beams) within the geometrical shape are computed; and/or
- at 610, other geometrical shapes (e.g., relating to the boundary 306) may be obtained (e.g., by implementing the steps 405-407) (notably, several information may be obtained, hence providing several radii) (notably, the radii may be obtained by comparisons with the "threshold 2 . . . X", which may be $\varepsilon_2$ discussed above and/or further thresholds);
- at 612, the UE signals to the BS or coordinating device information such as RI, PMI, CQI, the "radius 1", the "radius 2", and so on; in particular, the UE may signal:
  - the selected beam, i.e., first information 210; and
  - information relating to found other beams, such as the radius 1 (or another geometrical parameter that consents to identify those beams, around the selected beam, which have high interference with the selected beam), i.e., second information 212;
- at 614, the BS or coordinating device may proceed with operations such as scheduling and/or precoding, and so on, performed on the basis of the first and second information obtained from the UE (and, in case, from other UEs which communicate with the same BS or coordinating device).

Notably, in conventional technology, a major drawback is that it takes a lot of time if the number of precoded CSI-RS is large. However according to examples, un-precoded CSI-RS may be used, such that the UE can compute an effective channel from unprecoded CSI-RS and codebook entries. Thresholds for surrounding beams (selected beam and other beams 301*b*) can be signaled by higher layers in the DCI or determined by the UE according to interference situation. If the thresholds are not signaled by higher layers in the DCI, the thresholds are feedback together with the radius and other feedback.

Some Advantages of Proposed Solution

Extensions and alternative to INR feedback
enhance multi-user multiplexing gains due to precise multi-user interference
scheduling gains
less adaptations losses

6. Further Examples

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

7. Acronym List

CSI: Channel State Information
CQI: Channel Quality Indicator
RI: Rank indicator
RS: Reference Symbols
CSI-IM: CSI interference measurement
CSI-RS: CSI reference symbols
MCS: Modulation and Coding Scheme
INR: Interference to Noise Ratio
PMI: Preferred Matrix Index
DCI: Downlink Control Information
DoD: Direction of Departure
eNB: evolved NodeB: Term for base station in 4G-LTE
gNB: generalized NodeB: Term for base station in 5G-NR
UE: user equipment
BS: base station
PRB: Physical Resource Block—describing a predefined number of OFDM-subcarriers and OFDM symbols to from a PRB.

The invention claimed is:

1. A user equipment (UE) configured for operating in a wireless communication network with a plurality of other communication devices using a multiple-input-multiple-output, MIMO, communication, wherein the UE includes an antenna array for receiving beams, wherein the UE is configured to perform and evaluate measurements on at least one set of suitable beams received in downlink from multiple transmission/reception points (TRPs), the set of suitable beams having a predetermined number of beams, so as to evaluate or estimate channel information associated to the set of suitable beams, wherein the UE is configured to select, based on the measurements:

one single preferred beams from the set of suitable beams transmitted from a first TRP; and from the set of suitable beams, one single other beams transmitted from another TRP which has a comparatively high or low correlation with the one single preferred beams, wherein the UE is configured to transmit, to at least one of the multiple TRPs:

first information identifying the one single preferred beams; and second information identifying the one single other beams.

2. The UE of claim 1, configured to:

evaluate or estimate channel information associated to beams different from the one single preferred beams to select the one single other beam.

3. The UE of claim 2, configured to:

verify whether the channel information is greater than a first threshold to find the one single other beams.

4. The UE of claim 1, configured to:

evaluate or estimate channel information for beams which are not the one single preferred beams;

retrieve highly correlated beams which maximize a channel condition with the one single preferred beams;

provide information of the highly correlated beams as the second information.

5. The UE of claim 1, wherein the channel information includes a channel quality indicator, CQI, or single unit CQI, SU-CQI or a rank indication.

6. The UE of claim 1, wherein the channel information includes a signal to noise ratio, SNR.

7. The UE of claim 1, configured to calculate the channel information based on received reference symbols.

8. The UE of claim 1, wherein the channel information includes interference information.

9. The UE of claim 1, configured to create an ordered list of best beam candidates and to report them to the multiple TRPs.

10. The UE of claim 1, wherein the selected one single other beams is a beams which, if transmitted simultaneously with the one single preferred beams, would cause interference.

11. The UE of claim 1, wherein the one single other beams which maximizes correlation with the one single preferred beam has high spatial correlation.

12. The UE of claim 1, wherein the one single other beams which has a correlation above a predetermined threshold with the one single preferred beam has high correlation.

13. The UE of claim 1, configured to perform channel measurement on the basis of an unprecoded Channel State Information reference symbol, CSI-RS, received from the multiple TRPs.

14. The UE of claim 1, wherein the at least one set is an aggregation of multiple sets containing suitable beams, wherein the suitable beams are joint or disjoint members of the different sets.

15. The UE of claim 1, wherein the at least one set is associated to different TRPs.

16. The UE of claim 1, wherein the other communication devices are TRPs.

17. A method for wireless communications, comprising:

receiving, through an antenna array, a set of suitable beams, performing and evaluating measurements on the set of suitable beams received in downlink from multiple transmission/reception points (TRPs), the set of suitable beams having a predetermined number of beams, so as to evaluate or estimate channel information associated to the set of suitable beams;

selecting, based on the measurements, one singleer mere preferred beams from the set of suitable beams transmitted from a first TRP; and selecting one single other beams transmitted from another TRP which has a comparatively high or low correlation with the one singleor more preferred beams, sending towards at least one of the multiple TRPs:

first information identifying the one single preferred beams; and second information identifying the one single other beams.

* * * * *